JOG UP

JOG DOWN

FEED DOWN UNDER CONTROL OF ARC VOLTAGE

CRATER ELIMINATION FEED UP

Patented Mar. 10, 1953

2,631,257

UNITED STATES PATENT OFFICE 2,631,257

AUTOMATIC ALTERNATING CURRENT ARC WELDING SYSTEM

Alfred F. Chouinard, Chicago, Ill., assignor to National Cylinder Gas Company, Chicago, Ill., a corporation of Delaware Original application October 18, 1949, Serial No. 122,029, now Patent No. 2,602,870, dated July 8, 1952. Divided and this application May 19, 1951, Serial No. 227,178

6 Claims. (Cl. 314—32)

My invention relates, generally, to arc welding systems, and it has particular relation to automatic arc welding systems. This application is a division of application Serial No. 122,029, filed October 18, 1949, now U. S. Patent 2,602,870, issued July 8, 1952.

Among the objects of my invention are: To provide for feeding a welding electrode to maintain an arc between it and work on which a welding operation is to be performed, the feeding of the electrode taking place in a new and improved manner at a speed which is determined by the voltage across the arc; to employ a reversing relay for controlling the direction of rotation of the motor; to operate the reversing relay in accordance with the position of a manually operable switch; to provide for connecting the motor for energization to a fixed voltage source; and to energize the motor with a voltage derived from across the welding arc through a step up transformer.

Other objects of my invention will, in part, be obvious and in part appear hereinafter.

My invention is disclosed in the embodiment thereof shown in the accompanying drawings and it comprises the features of construction, combination of elements, circuit connections and arrangement of parts which will be exemplified in the construction hereinafter set forth and the scope of the application of which will be indicated in the appended claims.

Figure 1:
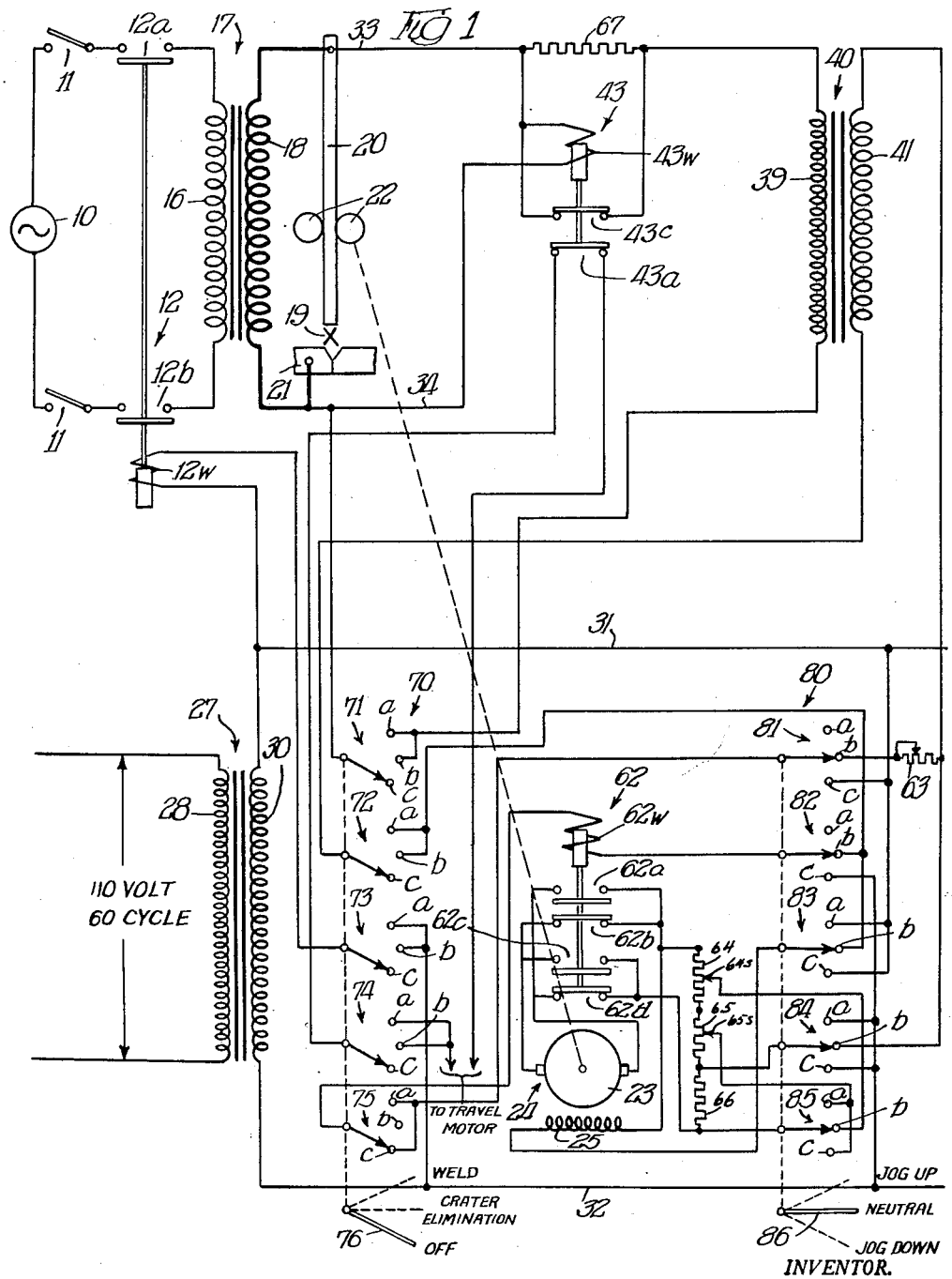

For a more complete understanding of the nature and scope of my invention, reference may be had to the following detailed description, taken together with the accompanying drawings, in which:

Figure 1 illustrates diagrammatically an embodiment of my invention in which the energy for operating the motor for feeding the electrode toward the work under welding conditions is derived solely from the arc circuit; and Figures 2, 3, 4, and 5 are circuit diagrams which show the connections to the motor for operating it in either a forward or a reverse direction under different operating conditions and employing the circuit connections as shown in Figure 1.

Referring now particularly to Figure 1 of the drawings, it will be observed that the reference character 10 designates a source of alternating current, such as a sixty cycle source. For illustrative purposes the source 10 has been indicated as providing a voltage of 440 volts for energizing the system to be described presently. One terminal of the source 10 may be grounded and the chassis of the control apparatus to be described may be connected to the same ground. It will be understood that any conventional source of alternating current can be employed and that the source 10 is merely representative of such conventional source. The source 10 may be connected by switches 11 and a line contactor 12 for energizing the primary winding 16 of a welding transformer that is shown generally at 17. The welding transformer 17 has a low voltage secondary winding 18 which, in conventional manner, may be connected to maintain a welding arc 19 between a welding electrode 20 and work 21 on which the welding operation is to be performed.

With a view to feeding the welding electrode 20 forwardly toward the work 21 and retracting it therefrom, feed rollers 22 are provided. One or more of these feed rollers may be connected, as shown, to an armature 23 of a series type motor that is indicated, generally, at 24. The motor 24 includes a series field winding 25. As will appear hereinafter, the armature 23 and series field winding 25 are connected in series circuit relation and provision is made for reversing the connections of one with respect to the other for the purpose of feeding the welding electrode 20 toward or away from the work 21.

It will be noted that an auxiliary transformer, shown generally at 27, is provided having a primary winding 28 which is connected to be energized from a 110 volt sixty cycle source. The transformer 27 has a secondary winding 30 which is arranged to energize conductors 31 and 32 with a fixed voltage. This voltage may also be 110 volts. It will be understood that this voltage is stated for illustrative purposes only since, with appropriate changes in design, another voltage can be employed.

It is pointed out that, in general, the speed at which the motor 24 moves the electrode 20 forwardly toward the work 21 is controlled by a voltage which is derived from the voltage across the arc 19. As will appear presently, provision is made for deriving a voltage from the arc 19 which is substantially higher than the arc voltage. This voltage is applied to the armature 23 and field winding 25 in series so that the former rotates at a speed which, in effect, is determined by the voltage across the arc 19. Thus, as the voltage across the arc 19 increases, the speed at which the armature 23 rotates is increased to effect a faster forward feeding of the electrode 20. Conversely, when the voltage across the arc 19 decreases, the effective voltage applied to the armature 23 and series field winding 25 is reduced and, accordingly, the armature 23 rotates at a slower speed. It will be noted that the voltage across the arc 19 is applied between conductors 33 and 34.

As pointed out above, provision is made for obtaining a voltage which is a function of the voltage across the arc 19 but which is substantially greater in magnitude. For this purpose a primary winding 39 of a transformer, shown generally at 40, is connected for energization across the conductors 33 and 34. The transformer 40 has a secondary winding 41. The transformer 40 has a high ratio of transformation. For example, the number of turns on the secondary winding 41 may be about five times the number of turns on the primary winding 39. It will be understood, however, that other ratios of transformation can be employed with appropriate changes in design of the remaining circuit constants.

In the embodiment of the invention illustrated in the drawings provision is made for connecting the motor 24 for energization through the transformer 40 across the welding arc 19, the arrangement being such that the energy for operating the motor 24 to feed the welding electrode 20 is obtained solely from the arc circuit.

The relationship between the armature 23 and series field winding 25 of the motor 24 can be reversed by a reversing relay which is indicated, generally, at 62. This relay has a winding 62w, normally open contacts 62a—62c, and normally closed contacts 62b—62d. As will appear hereinafter the operating winding 62w is connected for energization under certain operating conditions across the high voltage secondary winding 41 of the transformer 40. In order to change the voltage supplied to the winding 62w an adjustable resistor 63 may be provided as indicated.

The speed at which the motor 24 operates is determined, in part, by resistors 64, 65 and 66. Sliders 64s and 65s can be moved along resistors 64 and 65, as indicated, for varying the connections thereto.

With a view to decreasing the voltage which is applied across the primary winding 39 of the transformer 40 when a high open circuit voltage exists between the electrode 20 and the work 21, as when the arc 19 is not maintained therebetween and they are separated, a resistor 67 is connected in series with the primary winding 39. The resistor 67 may be short circuited by normally closed contacts 43c of a high arc voltage responsive relay 43. The operating winding 43w of the relay 43 is connected across the secondary winding 18 of the welding transformer 17 and it is arranged to be energized sufficiently to open contacts 43a and 43c when a high voltage, such as 80 volts, appears across the terminals of the secondary winding 18. Below this voltage and during normal welding operations, operating winding 43w is not energized sufficiently to open contacts 43a and 43c and they remain closed.

Figure 5:
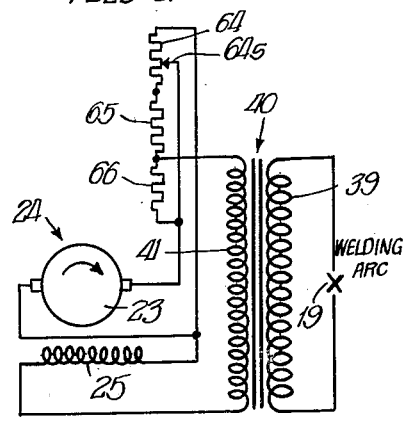

The direction of rotation of the armature 23 is controlled for welding purposes by a manually operated welding control switch which is indicated, generally, at 70. The switch 70 is made up of five switch units 71 through 75 which may be operated by means of a handle 76 to any one of three positions indicated at a, b and c. It will be observed that the switch 70 has three positions. It is shown in the off position. When the handle 76 is moved so that the contacts a are engaged, the system is connected as shown diagrammatically in Figure 4 so that the motor 24 is connected for energization across the high voltage secondary winding 41 of the transformer 40 and acts to feed the welding electrode 20 toward the work 21 at a speed such that a predetermined voltage is maintained across the arc 19. When the handle 76 of the switch 70 is moved to the b position, the connections between the armature 23 and series field winding 25 are reversed, as shown in Figure 5, so that the motor 24 feeds the electrode 20 upwardly at a speed which is determined by the voltage across the arc circuit.

Figure 2:
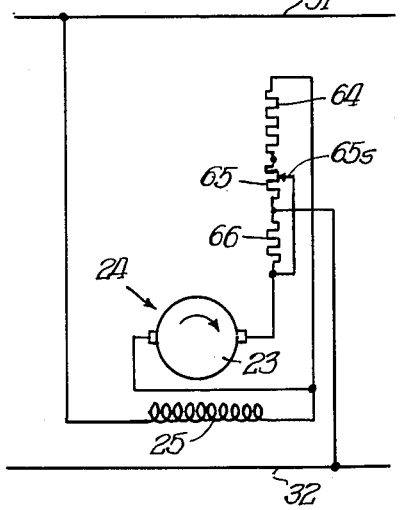
Figure 3:
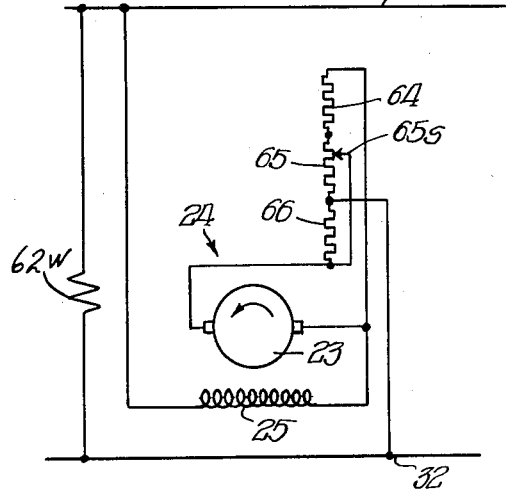
Figure 4:
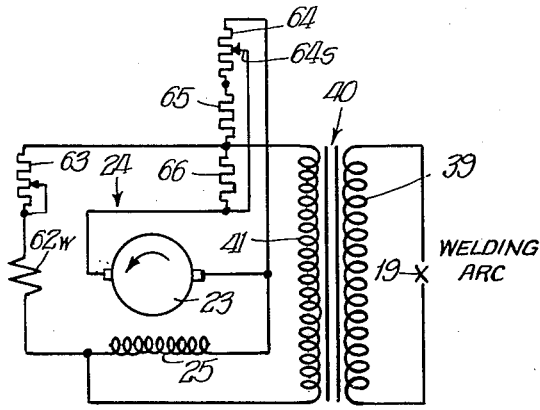

The electrode 20 can be moved toward or away from the work 21 under the control of a manually operated jog switch which is indicated, generally, at 80. The switch 80 is made up of five switch units indicated, generally, at 81 through 85. A handle 86 is provided for operating these switch units together to any one of three positions indicated at a, b and c. The switch 80 is shown with the handle 86 and the switch units 81 through 85 in the neutral position. The handle 86 can be swung to the a position for jogging the electrode 20 upwardly away from the work 21. The energizing circuit for the motor 24 in the jog-up position of the switch 80 is shown in Figure 2. It will be observed that the motor 24 is connected for energization between the conductors 31 and 32 which have a fixed voltage applied thereto from the secondary winding 30 of the transformer 27. Its primary winding 28 may be energized from the source 10 or a separate source as desired. When the handle 86 is moved to the c or jog down position, the electrode 20 is moved toward the work 21. The circuit connections for the motor 24 for the jog down position are illustrated diagrammatically in Figure 3. It will be observed that the connections between the armature 23 and series field winding 25 are reversed from those shown in Figure 2. Also it will be noted that the operating winding 62w of the reversing relay 62 is connected for energization between the conductors 31 and 32.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. In an automatic arc welding system wherein a welding electrode is fed toward work and an arc is maintained therebetween from an alternating current source, in combination, an electric motor for feeding said electrode, and a transformer having a primary winding with a relatively small number of turns connected for energization across said arc and a secondary winding with a relatively large number of turns connected to energize said motor at a voltage substantially higher than the arc voltage whereby the same feeds said electrode toward said work so as to maintain the voltage across said arc within predetermined limits, the energy for operating said motor being derived solely from across said arc.

2. In an automatic arc welding system wherein a welding electrode is moved relative to work and an arc is maintained therebetween from a current source, in combination, an electric motor for moving said electrode, a reversing relay connected to said motor for controlling its direction of rotation, circuit means for connecting said motor through said reversing relay for energization across said arc whereby said motor moves said electrode at a speed determined by the voltage across said arc, and manually operable switch means for controlling said reversing relay to operate said motor selectively in either direction.

3. In an automatic arc welding system wherein a welding electrode is moved relative to work and an arc is maintained therebetween from a current source, in combination, an electric motor for moving said electrode, a reversing relay connected to said motor for controlling its direction of rotation, circuit means for connecting said motor through said reversing relay for energization across said arc whereby said motor moves said electrode at a speed determined by the voltage across said arc, manually operable switch means for controlling said reversing relay to operate said motor selectively in either direction by energy derived from the arc circuit, circuit means for connecting said motor through said reversing relay for energization to a fixed voltage source, and manually operable switch means for controlling said reversing relay to operate said motor selectively in either direction by energy derived from said fixed voltage source.

4. In an automatic arc welding system wherein a welding electrode is moved relative to work and an arc is maintained therebetween from an alternating current source, in combination, an electric motor for moving said electrode, a reversing relay connected to said motor for controlling its direction of rotation, a transformer having a primary winding for connection across said arc and a secondary winding for connection through said reversing relay to said motor whereby said motor moves said electrode at a speed determined by the voltage across said arc, and manually operable switch means for controlling said reversing relay to operate said motor selectively in either direction.

5. In an automatic arc welding system wherein a welding electrode is moved relative to work and an arc is maintained therebetween from an alternating current source, in combination, an electric motor for moving said electrode, a reversing relay connected to said motor for controlling its direction or rotation, a transformer having a primary winding for connection across said arc and a secondary winding for connection through said reversing relay to said motor whereby said motor moves said electrode at a speed determined by the voltage across said arc, manually operable switch means for controlling said reversing relay to operate said motor selectively in either direction by energy derived solely from the arc circuit, circuit means for connecting said motor for energization to a fixed voltage source, and manually operable switch means for controlling said reversing relay to operate said motor selectively in either direction by energy derived solely from said fixed voltage source.

6. In an automatic arc welding system wherein a welding electrode is moved relative to work and an arc is maintained therebetween from an alternating current source, in combination, an electric motor for moving said electrode, a reversing relay connected to said motor for controlling its direction of rotation, a transformer having a primary winding for connection through said reversing relay to said motor whereby said motor moves said electrode at a speed determined by the voltage across said arc, a resistor connected in series between said arc circuit and said primary winding, a relay having an operating winding for connection across said arc and normally closed contacts connected to short circuit the resistor, said contacts being opened when the voltage across said arc circuit exceeds a predetermined value, and manually operable switch means for controlling said reversing relay to operate said motor selectively in either direction.

ALFRED F. CHOUINARD.

REFERENCES CITED

The following references are of record in the file of this patent:

UNITED STATES PATENTS

| Number | Name | Date |
|---|---|---|
| 1,690,489 | Hume | Nov. 6, 1928 |
| 1,915,981 | Davis | June 27, 1933 |
| 1,976,551 | Frick | Oct. 9, 1934 |
| 2,008,411 | Blankenbuehler | July 16, 1935 |
| 2,253,321 | Blankenbuehler | Aug. 19, 1941 |
| 2,340,093 | White | Jan. 25, 1944 |
| 2,354,364 | Chapman | July 25, 1944 |
| 2,371,894 | Kennedy | Mar. 20, 1945 |